(12) United States Patent
Rapaich

(10) Patent No.: US 7,132,927 B2
(45) Date of Patent: Nov. 7, 2006

(54) UNIVERSAL SERIAL BUS EXTENSION CABLE

(75) Inventor: Mark Rapaich, Westfield, IA (US)

(73) Assignee: Gateway Inc., Irvine, CA (US)

( * ) Notice: Subject to any disclaimer, the term of this patent is extended or adjusted under 35 U.S.C. 154(b) by 261 days.

(21) Appl. No.: 10/765,606

(22) Filed: Jan. 27, 2004

(65) Prior Publication Data
US 2004/0186926 A1 Sep. 23, 2004

Related U.S. Application Data

(60) Provisional application No. 60/443,078, filed on Jan. 28, 2003.

(51) Int. Cl.
*H04M 11/04* (2006.01)

(52) U.S. Cl. .................. 340/310.01; 340/310.08; 709/233; 709/245; 710/129; 710/131

(58) Field of Classification Search ........ 340/310.01, 340/310.08; 709/233, 245; 710/131, 129
See application file for complete search history.

(56) References Cited

U.S. PATENT DOCUMENTS

| | | | |
|---|---|---|---|
| 6,308,215 B1 * | 10/2001 | Kolbet et al. ........... | 709/233 |
| 6,571,305 B1 | 5/2003 | Engler | |
| 6,584,519 B1 | 6/2003 | Russell | |
| 6,708,247 B1 * | 3/2004 | Barret et al. ........... | 710/313 |
| 2003/0007503 A1 * | 1/2003 | Daum et al. ........... | 370/465 |

FOREIGN PATENT DOCUMENTS

JP 09106200 11/1998
JP 02244779 8/2002

OTHER PUBLICATIONS

Latest Internet Via Powerlines Technology Launched in Europe—BNI—Mar. 25, 1998 Newsbytes News Network—ISSN 0983-1592—Article—.
www.corinex.com/web/doccx.nsf/a7b17e752fd2a7fac1256aed00421e0/79/6007a9f.. . —Corinex Intelligent PowerNet USB—.
NPA—02-42—82511710—efficient networks releases new generation of powerline home networking devices; speed stream 2501, 2502, and 2521 . . . —NDN—214-0482-2612-7.
www.provantage.com/VIOGRO2J.HTM—bluetooth to usb adapter class 1 to 330 foot range provantage.com.
www.provantage.com/VIOGR02N.HTM—Provantage.com—HomePlug Ethernet Bridge.
Speed Stream Powerline USB Adapter—Siemens.
www.usbnews.net/news/homeplug%20usb%20networking.htm—USB News—USB-To-HomePlug Networking Wall Adapter.

* cited by examiner

*Primary Examiner*—Tai Nguyen
(74) *Attorney, Agent, or Firm*—Jeffrey A. Proehl; Woods, Fuller, Shultz & Smith

(57) ABSTRACT

A controller capable of being located in a peripheral device or host, is capable of engaging in data communications with a host or peripheral device over a power line. A power line interface provides a first data communications interface over the power line. An interface controller connects peripheral device and host using the first and a second data communications interface having a protocol. A power supply supplies power associated with the second interface. The controller appears to the peripheral device as the host or as the host to the peripheral. In accordance with the protocol the power supply supplies power such that the interface is fully compliant with the protocol.

20 Claims, 6 Drawing Sheets

UNIVERSAL SERIAL BUS EXTENSION CABLE

This application is related and claims priority to U.S. provisional application No. 60/443,078, filed Jan. 28, 2003, entitled "APPARATUS AND METHODS OF NETWORKING DEVICES, SYSTEMS AND COMPUTERS VIA POWER LINES", the entirety of which is incorporated by reference herein, including all of the documents referenced therein.

BACKGROUND OF THE INVENTION

1. Field of the Invention

The present invention relates to devices, systems, and processes used in Power Line Network Adapter (PLNA) environments, and more specifically to extending the capability of a Universal Serial Bus (USB) port using power lines and related interfaces.

2. Brief Description of the Related Art

The Universal Serial Bus (USB) is a universal wired interface for serial communications. The USB interface in accordance with version 1.1 of the USB specification is rated at 12 Mbps supporting low-speed and mid-speed data rate applications. Examples of low-speed applications include relatively simple devices such as keyboards, mice, and the like while mid-speed applications include audio and telephony applications and the like. It will further be appreciated that USB v1.1 is capable of handling video transfers on a limited basis provided various parameters such as frame speed and frame size bring the data transfer rate within the physical limitations of the interface. In more recent versions of the USB specification, such as, for example, version 2.0, faster data rates are contemplated on the order of 480 Mbps. Thus, a broader range of peripherals can be used with USB v2.0. The higher speed applications would include digital video and the like.

An exemplary USB configuration is shown in FIG. 1. As can be seen in exemplary scenario 100, the minimum configuration to establish serial communication over a USB interface requires at least host controller 110, such as a processor, intelligent device, or the like, and at least one USB device 130 which can be a device such as a keyboard, mouse, or the like or a generic device often described as a node or hub. It should be appreciated that unlike host controllers, USB device 130 need not be intelligent and may include simple devices such as a speaker. A simple case might include a computer acting as host controller 110 and a USB speaker acting as USB device 130 in a configuration where the speaker needs to be connected to the host. In a typical application, USB compliant cable 120 having a USB compliant plug connector type (not shown), for example to match the corresponding USB jack type (not shown) on at least the host end thereof, is connected between host controller 110 and USB device 130, a speaker for example, and the computer can then send, for example, digital audio signals to the speaker. It is important to note that in FIG. 1 power may be supplied from host 110 to USB device 130 via $V_{BUS}$ 121 and ground 124 lines with data being transferred on D+122 and D−123 lines as would be appreciated by one of ordinary skill in the art.

Problems arise however if a user wishes to put the speaker in a location remote from the host controller. If the distance is great enough, a USB cable will not work due to limitations associated with, for example, maximum wire length. Moreover, even when within maximum wire length, a wire may not be easy or desirable to use when the speaker placement is difficult to reach or in an area where a wire connection spanning between the computer and speaker would be unsightly.

One proposed approach, often referred to as Powerline technology, solves problems associated with connecting remotely located components with wires or cables by transmitting signals for various interfaces over household power lines, for example, by modulating the 110 or 120 VAC, 60 Hz household power supply with information signals. Transmitters and receivers are easily relocated anywhere where a wall outlet is present. One such Powerline standard interface is the HomePlug interface for transmitting data on household power lines. Many suppliers produce devices compliant with, for example, the HomePlug 1.0 standard and include network interfaces typically having a USB device interface and connector. Such interfaces do not address the problems arising in connection with the use of USB connected devices. Conventional USB to Powerline interfaces cannot presently act as virtual extension cords to other USB devices as will be explained in greater detail herein.

Conventional USB extenders are typically configured to provide host-to-host networking with additional latency and layers of protocol overhead via a special USB network operational mode. Alternatively, slave devices and host emulators exist but are limited in that 1) they cannot supply the 5V @ amp required under the USB specifications, and 2) they do not offer full operational capability. The combination of deficiencies associated with 1) and 2) result in devices which are limited in capability and are not USB compliant. A user at a first host desiring to, for example, print at a printer connected to a second host at the other end of a conventionally extended, e.g. host-to-host, Powerline connection must address the printer as a networked printer through the second host. Thus a simple, extended host-to-peripheral device connection is not possible with conventional USB extenders.

Consequently, it would be desirable to provide a device for effectively extending the wire length of a USB connection and allowing, for example, HomePlug technology to extend its usefulness beyond computer networking without adding new wires to a home or business. Such a device should be fully compliant with USB protocol and capable of being certified thereunder.

SUMMARY OF THE INVENTION

Accordingly, a device such as a controller which may be located in a host, a peripheral device or the like, such that it is integrated thereinto, or a device which may be external and stand alone is provided to extend the effective length of a connection provided in accordance with a USB protocol. It will be appreciated that while various exemplary embodiments are described herein with reference to various protocols such as USB, HomePlug, or the like. The present invention may be practiced in many different protocol environments where extension is desired.

In accordance with one exemplary embodiment, the present invention is directed to a controller located, for example, in a peripheral device such as a USB printer, USB speaker, USB camera, or the like, capable of engaging in data communications with a host, such as a USB host, for example a PC, computer, or the like, over a power line. The controller preferably includes a power line interface capable of providing a first data communications interface between the peripheral device and the host over the power line. An interface controller may be coupled to the power line interface and configured to connect the peripheral device with the host over the power line interface by way of the first data communications interface. A second data communications interface may be coupled to the interface controller and the peripheral device having an operating protocol associated with the data communications. A power supply coupled on one end to the power line and on the other end to the second data communications interface is preferably used to supply power associated with the second data communications interface as is required for example, under the USB specifications. It is important to note that the controller, in connection with information associated with the data communications received from the power line interface directed to the peripheral device, is configured to appear as the host in accordance with the protocol with the power supply supplying power to the second data communications interface in accordance with the protocol such that the interface, which is preferably a USB interface is fully compliant with the USB protocol. It should further be noted that the first data communications interface preferably includes a HomePlug Powerline interface and the second data communications interface preferably includes a Universal Serial Bus (USB) interface with the protocol naturally including a USB protocol according to USB revision 1.1, or USB revision 2.0.

In accordance with another exemplary embodiment, an exemplary controller is located in a host capable of engaging in data communications with a peripheral device over a power line, through, for example, a Powerline interface such as a HomePlug interface. The controller includes a power line interface as noted above, capable of providing a first data communications interface between the host and the peripheral device over the power line and further includes an interface controller coupled to the power line interface and configured to connect the host with the peripheral device over the power line interface using the first data communications interface, for example, on the power line side, and a second data communications interface coupled to the interface controller and the host. The second data communications interface has a protocol associated with, for example, the data communications such as, for example, a USB protocol. A power supply is coupled to the power line and the second data communications interface and supplies power associated with the second data communications interface. The controller, in connection with information associated with the data communications such as for example, packets or the like, received from the power line interface directed to the host, is configured to appear to the host as the peripheral device fully in accordance with the protocol. To further comply with the protocol, the power supply supplies power to the second data communications interface, for example at 5 volts DC at 1 amp, in accordance with the protocol such that the second data communications interface is fully compliant with the USB specification. As in other embodiments, the first data communications interface includes a HomePlug Powerline interface, the second data communications interface includes a Universal Serial Bus (USB) interface, and the protocol includes a USB protocol according to USB revision 1.1, USB revision 2.0, or the like.

In accordance with still another exemplary embodiment of the present invention, a peripheral device capable of engaging in data communications with a host over a power line, is provided with a power line interface, such as a HomePlug Powerline interface capable of providing a first data communications interface between the peripheral device and the host over the power line. A controller is coupled to the power line interface and configured to connect the peripheral device with the host over the power line interface using the first data communications interface, for example, on the power line side, and a second data communications interface coupled to the controller and the peripheral device. The second data communications interface has a protocol associated with, for example, the data communications such as, for example, a USB protocol. A power supply is coupled to the power line and the second data communications interface and supplies power associated with the second data communications interface. The controller, in connection with information associated with the data communications such as for example, packets or the like, received from the power line interface directed to the peripheral device, is configured to appear to the peripheral device as the host fully in accordance with the protocol. To further comply with the protocol, the power supply supplies power to the second data communications interface, for example at 5 volts DC at 1 amp, in accordance with the protocol such that the second data communications interface is fully compliant with the USB specification. As in other embodiments, the first data communications interface includes a HomePlug Powerline interface, the second data communications interface includes a Universal Serial Bus (USB) interface, and the protocol includes a USB protocol according to USB revision 1.1, USB revision 2.0, or the like.

In accordance with still another exemplary embodiment, a host capable of engaging in data communications with a peripheral device over a power line, is provided with a power line interface, such as a HomePlug Powerline interface capable of providing a first data communications interface between the host and the peripheral device over the power line. A controller is coupled to the power line interface and configured to connect the host with the peripheral device over the power line interface using the first data communications interface, for example, on the power line side, and a second data communications interface coupled to the controller and the peripheral device. The second data communications interface has a protocol associated with, for example, the data communications such as, for example, a USB protocol. A power supply is coupled to the power line and the second data communications interface and supplies power associated with the second data communications interface. The controller, in connection with information associated with the data communications such as for example, packets or the like, received from the power line interface directed to the host, is configured to appear to the host as the peripheral device fully in accordance with the protocol. To further comply with the protocol, the power supply supplies power to the second data communications interface, for example at 5 volts DC at 1 amp, in accordance with the protocol such that the second data communications interface is fully compliant with the USB specification. As in other embodiments, the first data communications interface includes a HomePlug Powerline interface, the second data communications interface includes a Universal Serial Bus (USB) interface, and the protocol includes a USB protocol according to USB revision 1.1, USB revision 2.0, or the like.

In accordance with still another exemplary embodiment, a controller, for facilitating data communications between a host and a peripheral device over a power line, includes a power line interface capable of providing a first data communications interface between the controller and: the host, when the controller is located in the peripheral device, and the peripheral device when the controller is located in the host. The first data communications interface is associated with communications over the power line using a wall plug capable of electrically connecting to the power line and a port interface capable of providing a second data communications interface. Communications over the second data communications interface are associated with data communications between the controller and: the host when the controller is located in the host, and the peripheral device when the controller is located in the peripheral device. It should be noted that communications over the second data communications interface proceed in accordance with a protocol associated with the data communications, such as a USB protocol. It should further be noted that the controller, in connection with the second data communications interface, is configured to appear to the host as the peripheral device when the controller is located in the host. The control is further configured to appear to the peripheral device as the host when the controller is located in the peripheral device. As in other embodiments, the first data communications interface includes a HomePlug Powerline interface and the protocol includes a Universal Serial Bus (USB) protocol according to USB revision 1.1, USB revision 2.0, or the like.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Accordingly, the present invention in accordance with various exemplary embodiments, is directed to a peripheral device, a host, and controller for facilitating data communications between the host and the peripheral device over a power line such that the power line acts as an extension and the data communications proceeds as if the host and the peripheral device were connected by a normal USB connector cable and in compliance with various USB standards.

Figure 1:
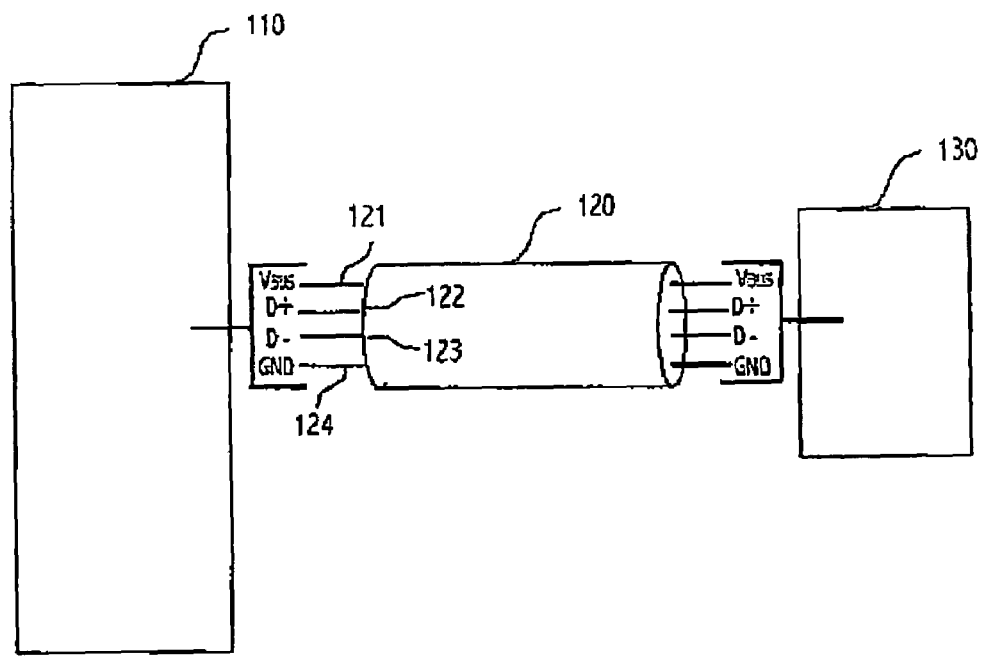
FIG. 1 is a diagram illustrating a conventional USB connection between a host and a USB device.
Figure 2:
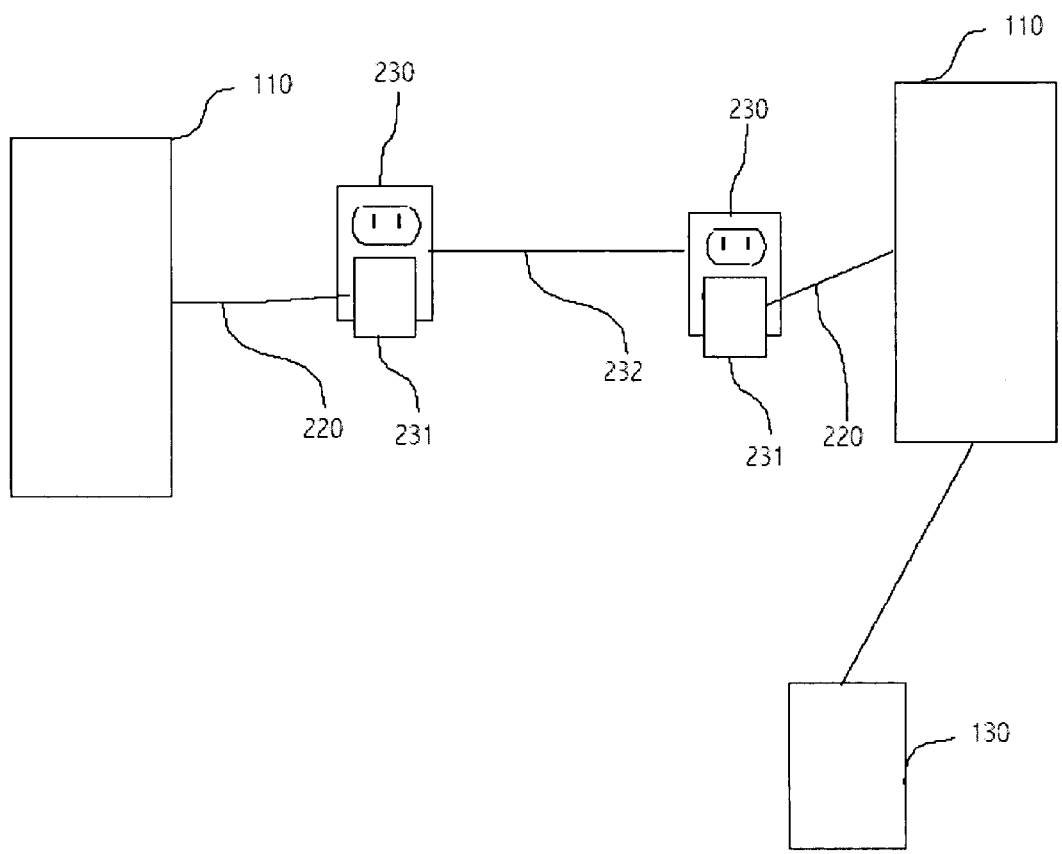
FIG. 2 is a block diagram illustrating an extended connection between a host and a USB device using a conventional Powerline arrangement.

Reference will now be made in detail to the presently preferred embodiments of the invention, examples of which are illustrated in the accompanying drawings. In FIG. 2 of the drawings, an exemplary scenario 200 is shown where host device 110, such as a PC, computing device, or the like is connected to another host device 110 through a powerline interface 232 as is typical in the prior art. A USB connection may be provided to each host device 110 through USB cables 220 and USB to powerline interface modules 231 which are plugged into wall plugs 230 and communicate over power line 230. It is typical in such a configuration for each host 110 to connect in a special network mode accommodated by USB specifications. Problems arise however in that if one of host 110 wishes to communicate with peripheral device 130, it must first be connected to local host 110 and then must be connected to remote host 110, e.g. on the other side of power line 230, using additional network protocol layers. The additional layers make such a configuration unsuitable for applications involving high speed, real time peripherals such as video devices and the like. What is needed is for the ability for a host to connect directly to a peripheral device through a power line interface and engage in high speed, streaming data communications.

Figure 3:
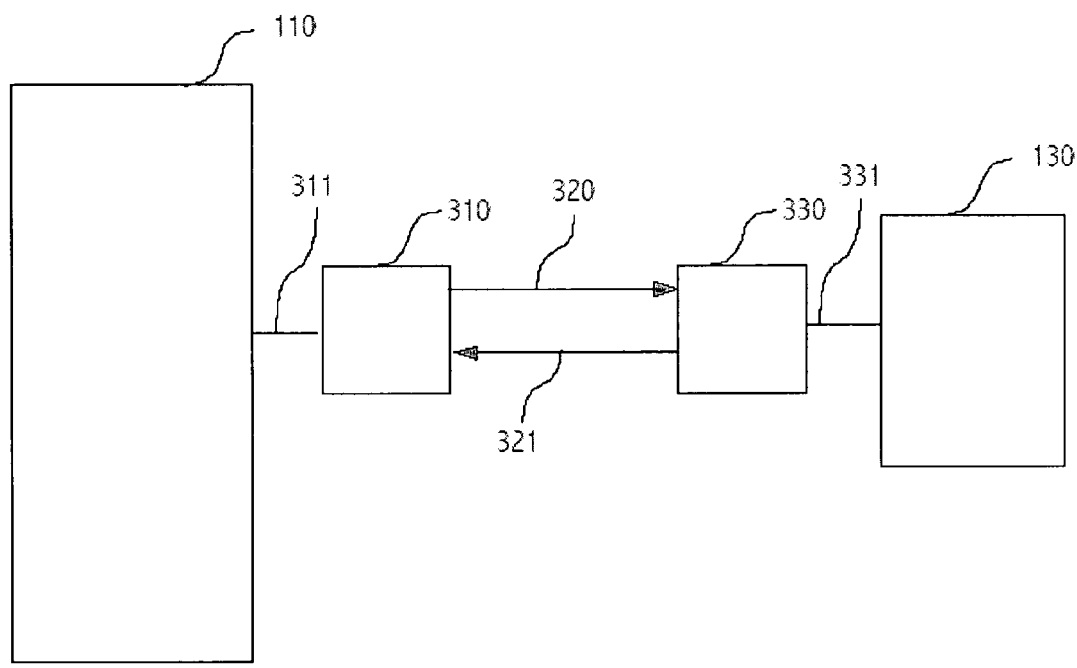
FIG. 3 is a block diagram illustrating a connection between a host and a USB 10 device using another conventional arrangement.

As previously described, some related systems exist for the use of, for example, existing residential and commercial power wiring for the extension of communications connections as shown for example in FIG. 3. One such system is described in U.S. Pat. No. 6,571,305 B1 issued to Engler on May 27, 2003 (hereinafter referred to as "Engler".) Engler describes a system to extend the length of a USB connection by using a host emulator and a USB device emulator. Connection may be made using a copper wire or may be made wirelessly. It is important to note however, that Engler, inter alia, fails to suggest extending the length of a USB connection using a powerline device and further fails to describe a device suitable for widespread use primarily because the device described in Engler could not be certified for USB use. Englers shortcomings in this regard result from, among other things, the failure of Engler to describe that power such as 5VDC at 1 amp is supplied to a peripheral device as required.

To better illustrate the shortcomings of related configurations such as Engler, FIG. 3 shows exemplary scenario 300 in accordance with related art where host 110 and peripheral device 130 are connected through an unspecified interface characterized by lines 320 and 321 terminated with modules 310 and 330. Lines 311 and 331 connect host 110 and peripheral device 130 to modules 310 and 330 respectively. In accordance with such a scenario, module 310 must be designated as a device emulator and module 330 must be designated as a host emulator. Further, as described above, there is no provision to provide power, for example, 5VDC at 1 amp, to peripheral device 130 as required for USB compliance. Other problems arise with such a configuration preventing full usefulness in a fully USB compliant operating environment. For example, with modules 310 and 330 operating in a slave mode, slave to slave communications would be susceptible to collisions, and other operating configurations are still limited by the operation of transceivers within modules 310 and 330 in a slave mode preventing fully compliant high speed operation sufficient to support high demand USB streaming transfer associated with, for example, video or the like.

Figure 4:
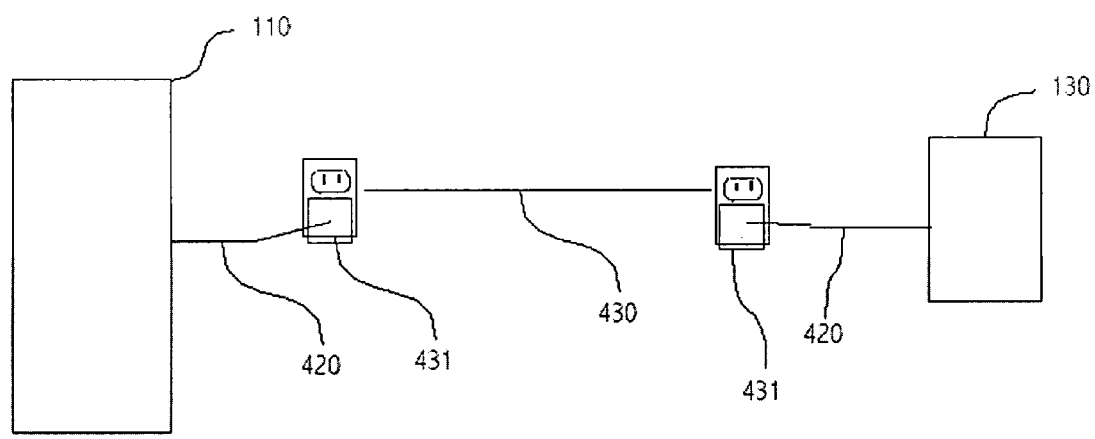
FIG. 4 is a block diagram illustrating a connection between a host and a USB device using a connection in accordance with various exemplary embodiments of the present invention.

In accordance with various exemplary embodiments of the present invention as shown, for example, in exemplary scenario 400 illustrated in FIG. 4, a Power line network including power line 430 is used to create a virtual USB wire between host 110 and USB peripheral device 130 through exemplary devices or controllers 431. Scenario 400 differs from existing Home Plug technology which presently allows a USB network to function with USB devices connected to intelligent systems such as two computers which see each other as network devices, as described for example in connection with FIG. 2. The present invention includes, for example, a new Homeplug MAC having a USB host controller capable of acting as a USB device or a USB host automatically. When USB peripheral device 130, such as a speaker or the like, is plugged into controller 431, other Power line networked devices connected via the USB network established over power line 430 to intelligent hosts understand by operation of the USB protocol that they must emulate a device to host 110 or any other hosts 110 on the network. Operation in such a manner fully complies with, for example, the "Plug and Play" feature of the USB specification. As a result of various exemplary configurations, host 110 sees peripheral device 130 as connected to one of its USB ports and operates accordingly. Because, in accordance with various protocols and specifications associated with Powerline technology, each Homeplug device has a unique ID, it is possible to construct tables or the like to establish a "who is seen by whom" system to track locations of devices hosts and the like to reduce confusion in networked environments in accordance with for example, higher layers of open architecture protocols. Thus using a system of this kind, USB peripheral device 130 which can be a USB printer configured as, for example, a network printer yet connected to a wall socket, a camera capable of downloading to a computer but located in a different room, or a USB speaker located in any room of the house, or the like can operate as though it was wired directly to host 110.

Figure 5:
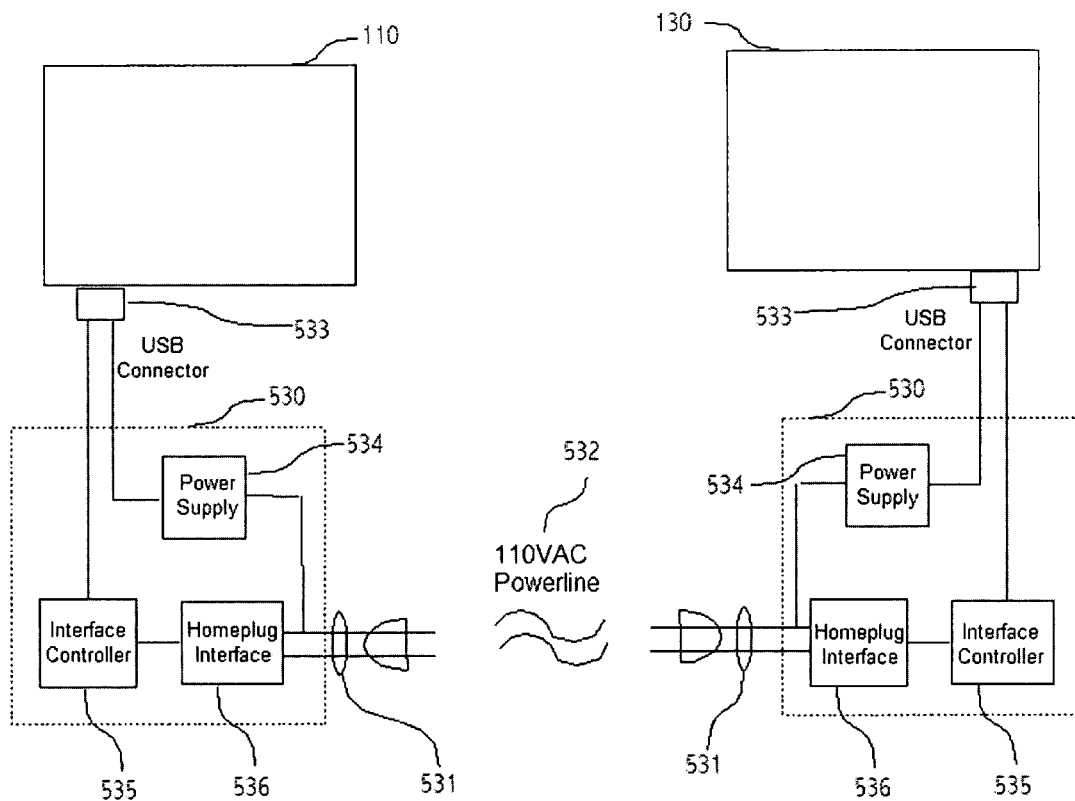
FIG. 5 is a block diagram illustrating components of an exemplary device in accordance with various exemplary embodiments of the present invention.
Figure 6:
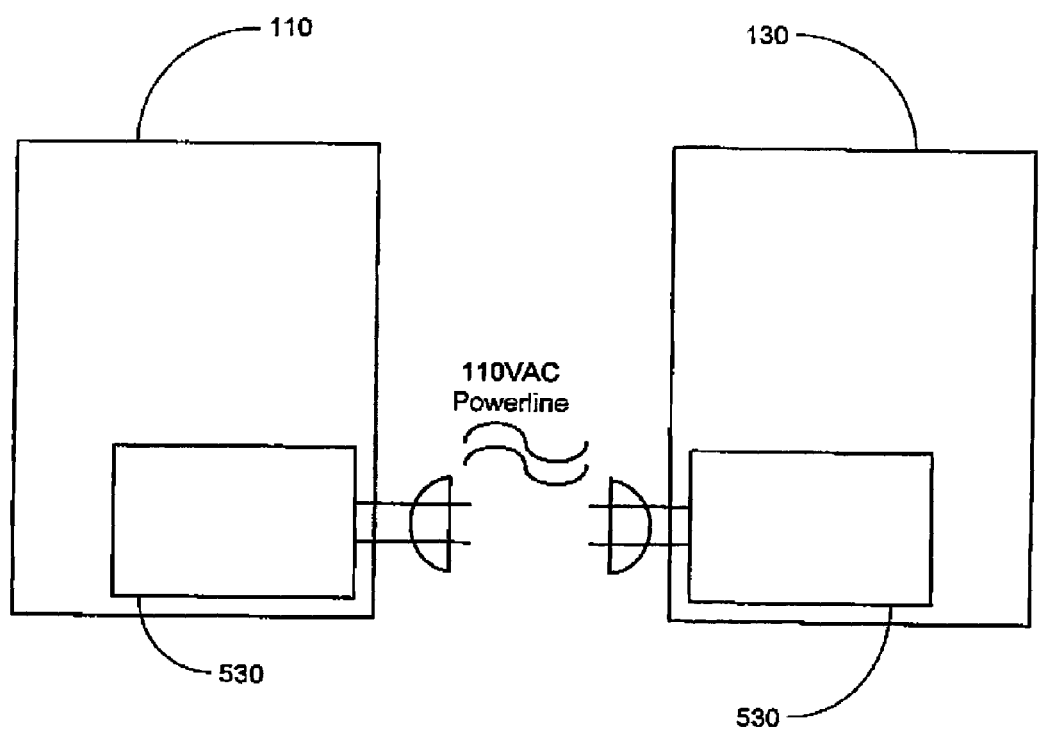
FIG. 6 is a block diagram illustrating components of an exemplary variation of a device in accordance with various embodiments of the present invention.

Exemplary scenario 500 in accordance with the present invention is shown in FIG. 5. It can be seen that host 110 and peripheral device 130 are connected through powerline 532 through controller 530 connected to each of host 110 and peripheral device 130 at the USB ports thereof through USB connector 533 and to each other through powerline 532 and respective wall plugs 531. Each controller 530 includes power supply 534 power for example from powerline 532 for providing power of at least 5 volts DC at 1 amp in accordance with the USB specification (revision 1.1, 2.0, or later), power line interface 536, such as a HomePlug interface, and interface controller 535. It will be appreciated that in accordance with various alternative exemplary embodiments, host 110 and peripheral device 130 may have controller 530 incorporated thereinto without departing from the invention (see, e.g., FIG. 6). As previously described, interface controller 535 may operate to appear to host 110 as peripheral device 130 and may operate to appear to peripheral device 130 as host 110 such that fully compliant USB communications, preferably high speed streaming communications may take place over the connection. It will further be appreciated that details regarding the specific operation of the USB and Homeplug protocols have been omitted for the sake of clarity. However one of ordinary skill in the art will understand how the attendant structure described herein will allow for operation in accordance therewith, and how certain features of the protocols may be best realized using the structures and inventive concepts described herein.

It is believed that the controller of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A controller located in a peripheral device capable of engaging in data communications with a host over a power line, the controller comprising:
   a power line interface capable of providing a first data communications interface between the peripheral device and the host over the power line;
   an interface controller coupled to the power line interface, the interface controller configured to connect the peripheral device with the host over the power line interface using the first data communications interface and a second data communications interface coupled to the interface controller and the peripheral device and having a protocol associated with the data communications; and
   a power supply coupled to the power line and the second data communications interface for supplying power associated with the second data communications interface;
   wherein the controller, in connection with information associated with the data communications received from the power line interface directed to the peripheral device, is configured to appear to the peripheral device as the host in accordance with the protocol and wherein the power supply supplies power to the second data communications interface in accordance with the protocol such that the second data communications interface is fully compliant with the protocol.

2. The controller according to claim 1, wherein the first data communications interface includes a HomePlug Powerline interface.

3. The controller according to claim 1, wherein the second data communications interface includes a Universal Serial Bus (USB) interface and the protocol includes a USB protocol.

4. The controller according to claim 3, wherein the protocol includes a USB protocol according to at least one of: USB revision 1.1, and USB revision 2.0.

5. A controller located in a host capable of engaging in data communications with a peripheral device over a power line, the controller comprising:
   a power line interface configured to provide a first data communications interface between the host and the peripheral device over the power line;
   an interface controller coupled to the power line interface, the interface controller configured to connect the host with the peripheral device over the power line interface using the first data communications interface and a second data communications interface coupled to the interface controller and the host and having a protocol associated with the data communications; and
   a power supply coupled to the power line and the second data communications is interface for supplying power associated with the second data communications interface;
   wherein the controller, in connection with information associated with the data communications received from the power line interface directed to the host, is configured to appear to the host as the peripheral device in accordance with the protocol and wherein the power supply supplies power to the second data communications interface in accordance with the protocol such that the second data communications interface is compliant with the protocol.

6. The controller according to claim 5, wherein the first data communications interface includes a HomePlug Powerline interface.

7. The controller according to claim 5, wherein the second data communications interface includes a Universal Serial Bus (USB) interface and the protocol includes a USB protocol.

8. The controller according to claim 7, wherein the protocol includes a USB protocol according to at least one of: USB revision 1.1, and USB revision 2.0.

9. A peripheral device capable of engaging in data communications with a host over a power line, the peripheral device comprising:
   a power line interface configured to provide a first data communications interface between the peripheral device and the host over the power line;
   a controller coupled to the power line interface, the controller configured to connect the peripheral device with the host over the power line interface using the first data communications interface and a second data communications interface coupled to the controller and the peripheral device and having a protocol associated with the data communications; and
   a power supply coupled to the power line and the second data communications is interface for supplying power associated with the second data communications interface;
   wherein the peripheral device, in connection with information associated with the data communications received from the power line interface directed to the peripheral device, is configured to appear to the peripheral device as the host in accordance with the protocol and wherein the power supply supplies power to the second data communications interface in accordance with the protocol such that the second data communications interface is compliant with the protocol.

10. The peripheral device according to claim 9, wherein the first data communications interface includes a HomePlug Powerline interface.

11. The peripheral device according to claim 9, wherein the protocol includes a Universal Serial Bus (USB) protocol.

12. The peripheral device according to claim 11, wherein the protocol includes a Universal Serial Bus (USB) protocol according to at least one of: USE revision 1.1, and USE revision 2.0.

13. A host capable of engaging in data communications with a peripheral device over a power line, the host comprising:
   a power line interface capable of providing a first data communications interface between the host and the peripheral device over the power line;
   a controller coupled to the power line interface, the controller configured to connect the host with the peripheral device over the power line interface using the first data communications interface and a second data communications interface coupled to the controller and the peripheral device and having a protocol associated with the data communications; and
   a power supply coupled to the power line and the second data communications interface for supplying power associated with the second data communications interface;
   wherein the host device in connection with information associated with the data communications received from the power line interface directed to the host, is configured to appear to the host as the peripheral device in accordance with the protocol and wherein the power supply supplies power to the second data communications interface in accordance with the protocol such that the second data communications interface is compliant with the protocol.

14. The peripheral device according to claim 13, wherein the first data communications interface includes a HomePlug Powerline interface.

15. The peripheral device according to claim 13, wherein the protocol includes a Universal Serial Bus (USB) protocol.

16. The peripheral device according to claim 15, wherein the protocol includes a Universal Serial Bus (USB) protocol according to at least one of: USB revision 1.1, and USB revision 2.0.

17. A controller for facilitating data communications between a host and a peripheral device over a power line, the controller comprising:
   a power line interface capable of providing a first data communications interface for the data communications between the controller and one of: the host when the controller is located in the peripheral device, and the peripheral device when the controller is located in the host, over the power line using a wall plug capable of electrically connecting to the power line; and
   a port interface capable of providing a second data communications interface for the data communications between the controller and the host when the controller is located in the host, and the peripheral device when the controller is located in the peripheral device, the second data communications interface proceeding in accordance with a protocol associated with the data communications;
   wherein the controller, in connection with the second data communications interface, is configured to: appear to the host as the peripheral device when the controller is located in the host, and to the peripheral device as the host when the controller is located in the peripheral device.

18. The controller according to claim 17, wherein the first data communications interface includes a HomePlug Powerline interface.

19. The controller according to claim 17, wherein the protocol includes a Universal Serial Bus (USB) protocol.

20. The controller according to claim 19, wherein the protocol includes a Universal Serial Bus (USB) protocol according to at least one of: USB revision 1.1, and USB revision 2.0.

* * * * *